United States Patent Office 3,792,034
Patented Feb. 12, 1974

3,792,034
TRIPEPTIDE AND ACID ADDITION SALTS
Walter Boguth, Riehen, Rolf Studer, Bottmingen, and Ute Achterrath and Hans Kunzi, Riehen, Switzerland, assignors to Hoffmann-La Roche Inc., Nutley, N.J.
No Drawing. Filed Mar. 29, 1972, Ser. No. 239,358
Int. Cl. C07c 103/52
U.S. Cl. 260—112.5                    2 Claims

ABSTRACT OF THE DISCLOSURE

L-pyroglutamyl-2,5-diiodo-L-histidyl-L-prolinamide and its acid addition salts are active as thyroidal agents, such as for example, in the treatment of hyperthyreosis. The iodinated tripeptide is conveniently prepared by iodinating 1-pyroglutamyl-L-histidyl-L-prolinamide.

BRIEF DESCRIPTION OF THE INVENTION

The present invention relates to the novel tripepide L-pyroglutamyl-2,5-diiodo-L-histidyl-L-prolinamide and acid addition salts thereof. This tripeptide chemically represents the thyreotropin-releasing factor (TRF) iodinated in the 2- and 5-positions of the imidazole ring. The compound of this invention and its said addition salts possess good thyreostatic properties which makes them suitable as an agent for reducing thyroid gland activity.

In a further aspect of the present invention, the iodinated tripeptide or an acid addition salt thereof is prepared from L-pyroglutamyl-L-histidyl-L-prolinamide or an acid addition salt by direct iodination of the latter.

The iodination takes place in the 2- and 5-positions of the histidine group and is carried out in accordance with general procedures for the electrophilic substitution of aromatic compounds. Thus the iodination is preferably carried out with iodine in an alkaline medium, particularly at pH 12–14 and in a two-phase system which consists of an aqueous-alkaline phase and an organic phase in which iodine is soluble. The iodination reaction is conducted at temperatures below about 25° C., most preferably at temperatures in the range of from about 0° to about 10° C.

Examples of aqueous-alkaline phases are aqueous solutions of alkali metal or alkaline earth metal hydroxides such as sodium hydroxide, potassium hydroxide or calcium hydroxide. Suitable water-immiscible organic solvents in which iodine is soluble are, for example, aliphatic and aromatic hydrocarbons which may be halogenated. Included in such solvents are hexane, benzene, methylene chloride, chloroform or carbon tetrachloride. Other useful solvents for this purpose include ethers such as diethyl ether, esters such as ethyl acetate or carbon disulfide. Hexane represents a preferred solvent.

The iodinated tripeptide of this invention can form acid addition salts. When used as a medicinal in this form, it is necessary to employ a pharmaceutically acceptable, non-toxic-acid addition salt. Pharmaceutically unacceptable acid addition salts of L-pyroglutamyl-2,5-diiodo-L-histidyl-L-prolinamide can be converted into pharmaceutically acceptable acid addition salt form by using procedures well known in the art such as for example, ion-exchange processes.

Suitable pharmaceutically acceptable, non-toxic acid addition salts into which the tripeptide can be converted in a manner known per se include inorganic acids such as hydrochloric acid, hydrobromic acid, phosphoric, sulphuric acid and perchloric acid or organic acids such as acetic acid, oxalic acid, maleic acid, malic acid, tartaric acid and citric acid.

The starting material for the instant process is the known L-pyroglutamyl-L-histidyl-L-prolinamide which can be isolated from the hypothalami of sheep, cattle or pigs or alternatively can be prepared by total synthesis following the procedure of D. Gillessen et al. [Helv. Chim. Acta 54. 63–72 (1970)].

When utilized as medicaments the iodinated tripeptide of the invention and its pharmaceutically acceptable, non-toxic acid addition salts are employed in the form of a conventional pharmaceutical preparation which contains the aforesaid active agent in association with a compatible inert pharmaceutical carrier. This carrier can be organic or inorganic suitable for enteral or parenteral administration such as, for example, water, gelatin, gum arabic, lactose, starches, magnesium sterate, talc, vegetable oils, polyalkyleneglycols, petroleum jelly, etc. The pharmaceutical preparations can be made up in solid, semi-solid or in liquid form. They may be sterilized and/or may contain adjuvants such as preserving, stabilizing, wetting or emulsifying agents, salts for varying the osmotic pressure or buffers. In addition, the preparations may contain other therapeutically active agents.

Suitable daily dosages for the treatment of hyperthyreosis are in the range of about 0.1–1000 mg. p.o. with actual dosages being adjusted to meet the exigencies of the treatment situation and the medicinal judgment of the person administering the compound.

The thyreostatic effect of L-pyroglutamyl-2,5-diiodo-L-histidyl-L-prolinamide hydrochloride can be shown by comparison with the known active agent diiodotyrosine. The substances to be tested were injected intraperitoneally on four successive days to each of 5 rats. The rats were killed on the 5th day and the thyroid glands histologically examined. On the follicles adjacent to the trachea there were measured:

(a) the thickness of the epithelium
(b) the thyreoglobulin content of the colloid (micro-interferometrically)

The standardized activity index (SAI) calculated from both values serves for the assessment.

These tests are run following procedure described by Boguth et al., Histochemie 5, 135–140 (1965) and by Boguth et al., "Vitamin A, E, K," publisher Frh. v. Kress and U. Blum, Schattauer-Verlag, Stuttgart/New York 1969.

The results of these tests are summarized in the following tables:

| Standard substance | | | Test substance | | |
|---|---|---|---|---|---|
| Daily Dosage (mg.) | Epithelium thickness ($\mu$) | Thyreoglobulin (vol. percent) | Daily dosage (mg.) | Epithelium thickness ($\mu$) | Thyreoglobulin (vol. percent) |
| 0.1 | 5.2 | 29.2 | 0.001 | 5.4 | 27.5 |
|  | 5.1 | 26.9 |  | 5.3 | 28.2 |
|  | 5.6 | 26.0 |  | 5.2 | 33.9 |
|  | 5.1 | 25.8 |  | 5.2 | 31.7 |
|  | 5.6 | 24.4 |  | 5.2 | 29.7 |
| 0.5 | 4.8 | 27.9 | 0.100 | 4.6 | 37.1 |
|  | 5.0 | 27.8 |  | 4.8 | 38.8 |
|  | 4.9 | 31.6 |  | 4.9 | 32.0 |
|  | 5.0 | 30.3 |  | 4.6 | 34.4 |
|  | 5.1 | 31.9 |  | 4.5 | 36.0 |
| 1.0 | 4.6 | 30.4 | 0.500 | 4.5 | 37.8 |
|  | 4.8 | 29.7 |  | 4.3 | 39.1 |
|  | 4.5 | 32.0 |  | 4.8 | 37.4 |
|  | 4.9 | 28.0 |  | 4.6 | 38.4 |
|  | 4.9 | 32.6 |  | 4.5 | 38.4 |

Standardized activity indices (mean value):

| Standard substance | | Test substance | |
|---|---|---|---|
| Dosage | SAI | Dosage | SAI |
| 0.1 | 0.48±0.03 | 0.001 | 0.44±0.03 |
| 0.5 | 0.42±0.02 | 0.100 | 0.34±0.03 |
| 1.0 | 0.40±0.02 | 0.500 | 0.31±0.01 |

The comparative activity of dihydrotyrosine (standard substance) and L - pyroglutamyl-2,5-diiodo-L-histidyl-L-prolinamide hydrochloride (test substance) as shown by the indicated tests demonstrate that the latter compound of the present invention is about 300 times as active (based on molar concentration).

Example 1

A solution of 0.80 g. of L-pyroglutamyl-L-histidyl-L-prolinamide acetate in 100 ml. of 0.5 N aqueous sodium hydroxide was treated with 50 ml. of hexane. 1.08 g. of iodine in 150–170 ml. of hexane were added dropwise with vigorous stirring to the mixture and the resulting mixture was cooled to 10° C. in such a way that during the reaction no excess iodine—recognizable by the color—was present in the emulsion. The addition was effected over a period of about 1 hour. The mixture was stirred for a further 2 hours at 0° C., acidified to pH 2 with concentrated hydrochloric acid and treated with vigorous stirring with 0.15 g. of potassium iodate in 15 ml. of water. After separation of the phases, the aqueous layer was extracted several times with hexane and brought to dryness under reduced pressure (0.2 mm. Hg/30°–40° C.). There were obtained 4.2 g. of a light-yellow product which was digested with 200 ml. of absolute ethanol. The solution was treated with Norit®, filtered through Dicalite® and concentrated. After the addition of absolute ether, there was obtained a white precipitate which was washed with absolute ether (yield: 0.880 g.). Thin-layer chromatographic and electrophoretic examination of the product indicated a purity of over 95 percent.

In order to remove traces of the non-iodinated starting material and other impurities, 0.5 g. of the iodinated product were subjected to carrier-free electrophoresis at pH 1.9 in a solution of 37 ml. of formic acid, 25 ml. of glacial acetic acid and 1000 ml. of water. After freeze-drying, there were obtained 0.38 g. of pure product, L-pyroglutamyl-2,5 - diiodo-L-histidyl-L-prolinamide hydrochloride, which was thin-layer chromatographically uniform in various systems. Amino acid analysis of the hydrolyzed sample yields: glutamic acid:diiodohistidine:proline:$NH_3$ =1.00:1.01:1.00:1.24.

Thin layer chromatography on ready-made TLC plates (Kieselgel $F_{254}$) layer thickness 0.25 mm. (Fa. Merck, Darmstadt):

chloroform/methanol (2:1): $R_f=0.45\pm0.02$
n-butanol/glacial acetic acid/water/ethyl acetate
  (1:1:1:1): $R_f=0.52\pm0.02$
n-butanol/glacial acetic acid/water (4:1:1):
  $R_f=0.36\pm0.02$
n-propanol/water (7:3): $R_f=0.49\pm0.02$
paper electrophoresis at pH 1.9 (25 ml. glacial acetic acid and 37 ml. formic acid in 1000 ml. water): $R_f$ (based on TRF)=0.55±0.05

Example 2

Tablets are manufactured utilizing the following compositions:

| | Mg. |
|---|---|
| Active ingredient | 5 |
| Lactose | 123 |
| Corn starch | 63 |
| Polyvinylpyrrolidone | 4 |
| Talcum | 5 |

The active ingredient is mixed with the lactose and the corn starch, and, after the addition of a solution of polyvinylpyrrolidone in 40 ml. of ethanol, granulated. The granulate is dried at 30°, mixed with talcum and pressed to tablets.

| | Mg. |
|---|---|
| Individual weight of one tablet | 200 |
| Active substance content of one tablet | 5 |

Example 3

Gelatin capsules are manufactured utilizing the following compositions:

| | Mg. |
|---|---|
| Active ingredient | 2.5 |
| Mannitol | 146.0 |
| Stearic acid | 1.5 |

The ingredients are homogenously mixed and filled into interlocking gelatin capsules via a capsule filling machine.

| | Mg. |
|---|---|
| Individual weight of one capsule | 150 |
| Active substance content of one capsule | 2.5 |

We claim:
1. L - pyroglutamyl-2,5-diiodo-L-histidyl-L-prolinamide and the acid addition salts thereof.
2. The compound of claim 1 which is L-pyroglutamyl-2,5-diiodo-L-histidyl-L-prolinamide hydrocloride.

References Cited
UNITED STATES PATENTS
3,715,434  2/1973  Mende _____ 260—112.5

OTHER REFERENCES

Boler et al., "Biochemical and Biophysical Research Communications," vol. 37, No. 4 (1969), pp. 705–709.

ELBERT LEE ROBERTS, Primary Examiner

U.S. Cl. X.R.
424—177

UNITED STATES PATENT OFFICE
CERTIFICATE OF CORRECTION

PATENT NO. : 3,792,034
DATED : February 12, 1974
INVENTOR(S) : Walter Boguth, et al It is certified that error appears in the above-identified patent and that said Letters Patent are hereby corrected as shown below:

Cover page, after

"Ser. No. 239,358" insert

April 7, 1971   Switzerland   5049/71

Signed and Sealed this first Day of June 1976

[SEAL]

Attest:

RUTH C. MASON
Attesting Officer

C. MARSHALL DANN
Commissioner of Patents and Trademarks